United States Patent
Liu

(10) Patent No.: US 11,593,239 B2
(45) Date of Patent: Feb. 28, 2023

(54) SYSTEM AND METHOD FOR REMOTELY BOOTING A SYSTEM

(71) Applicant: Dell Products L.P., Round Rock, TX (US)

(72) Inventor: Wei G. Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/385,386

(22) Filed: Jul. 26, 2021

(65) Prior Publication Data

US 2023/0027603 A1 Jan. 26, 2023

(51) Int. Cl.
*G06F 11/00* (2006.01)
*G06F 11/22* (2006.01)
*G06F 9/4401* (2018.01)

(52) U.S. Cl.
CPC ........ *G06F 11/2284* (2013.01); *G06F 9/4401* (2013.01); *G06F 11/2273* (2013.01)

(58) Field of Classification Search
CPC .......................... G06F 11/2284; G06F 11/2273
USPC ....................................................... 714/1–57
See application file for complete search history.

(56) References Cited

U.S. PATENT DOCUMENTS

| | | | |
|---|---|---|---|
| 2010/0023737 A1* | 1/2010 | Herzi ................. | G06F 11/2284 713/1 |
| 2012/0066430 A1* | 3/2012 | Cooper .............. | G06F 13/4022 710/316 |
| 2016/0259649 A1* | 9/2016 | Poornachandran ... | G06F 1/3203 |
| 2018/0330094 A1* | 11/2018 | Goeb ...................... | G06F 21/52 |
| 2019/0012263 A1* | 1/2019 | Jenne ................... | G06F 3/0619 |
| 2019/0073285 A1* | 3/2019 | Hayashida .......... | G06F 11/0757 |
| 2019/0080524 A1* | 3/2019 | Tucker ..................... | B64F 5/60 |
| 2019/0266037 A1* | 8/2019 | Shah ...................... | G06F 13/24 |
| 2020/0034268 A1* | 1/2020 | Ganesan ............. | G06F 11/3072 |
| 2021/0026649 A1* | 1/2021 | Kotary .................. | G06F 1/3212 |

* cited by examiner

*Primary Examiner* — Sarai E Butler
(74) *Attorney, Agent, or Firm* — McDermott Will & Emery LLP

(57) ABSTRACT

A system for configuring an information handling system into a minimum configuration mode. If an information handling system hangs, embodiments may communicate with a remote access controller to set a configuration flag corresponding to a minimum configuration mode. When the information handling system starts a POST process, the BIOS checks the configuration flag. If the flag is set, the BIOS initializes a single DIMM and bypasses any PCIe slot driver initializations and any non-essential services to allow the information handling system to complete the boot process. The information handling system may boot to a UEFI code to allow a user to diagnose a problem or boot to a BIOS setup code to allow the user to enable additional DIMMs, PCIe slots and turn on non-essential services.

20 Claims, 3 Drawing Sheets

SYSTEM AND METHOD FOR REMOTELY BOOTING A SYSTEM

BACKGROUND

Field of the Disclosure

This disclosure relates generally to information handling systems and, more particularly, to systems and methods for forcing an information handling system to boot in a minimum configuration.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be installed in remote locations where physical service is difficult and/or infrequent. In case of a problem with the information handling system, a user may prefer the information handling system continue to boot and function in a degraded mode until the next scheduled service visit.

SUMMARY

Embodiments disclosed herein may be generally directed to information handling systems and systems for remotely booting the information handling system in a configuration that allows the information handling system to continue processing information.

Embodiments may be directed to a system capable of detecting an issue with an information handling system and configuring the information handling system into a minimum configuration mode that guarantees the information handling system will boot.

Embodiments may implement different methods to put the information handling system into a minimum configuration mode. In some embodiments, a complex programmable logic device (CPLD) can store a minimum configuration bit to activate the minimum configuration mode.

Embodiments allow a user to remotely recover an information handling system to a minimum configuration, access the information handling system in the minimum configuration mode to diagnose the problem and possibly reconfigure the information handling system to a configuration with more functionality than the minimum configuration mode. The information handling system will be able to boot to UEFI setup. The user can then re-enable the healthy DIMM slots, map out the bad DIMMs, and bring the information handling system back online. The information handling system can operate in this degraded configuration mode until the next service crew visit.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1:
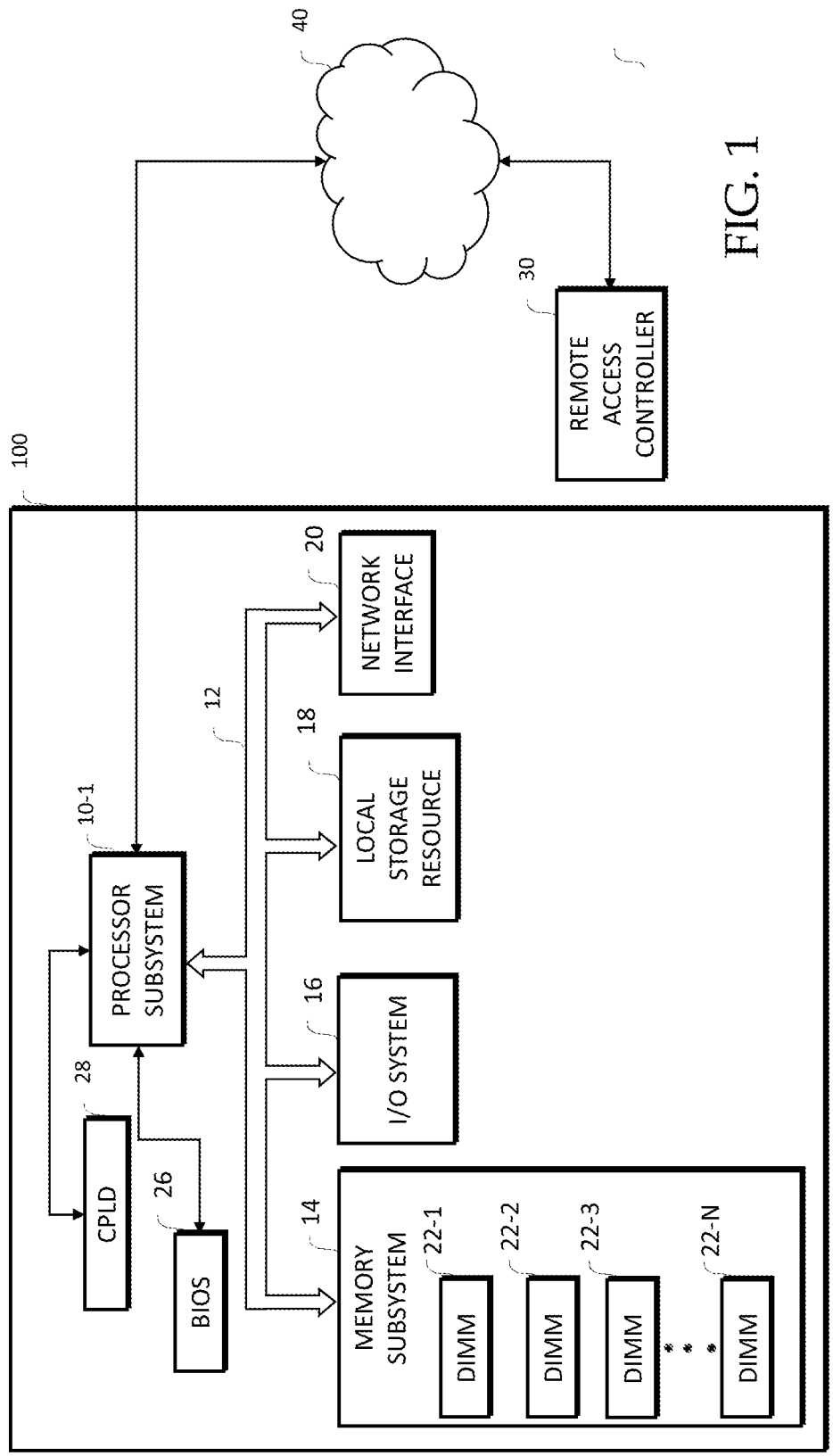
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, DIMM "22-1" refers to an instance of a DIMM, which may be referred to collectively as DIMMs "22" and any one of which may be referred to generically as DIMM "22."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Embodiments disclosed herein include an information handling system with a remote access system for detecting an issue with the information handling system and reconfiguring the information handling system into a minimum configuration mode.

Embodiments allow information handling systems to boot into either a normal configuration mode or a minimum configuration mode, wherein an information handling system operating in a minimum configuration mode is capable of performing at least some basic processing and communicating with an information handling system over a network.

Embodiments disclosed herein are described with respect to servers installed in remote locations but may also be practiced with other information handling systems. Particular embodiments are best understood by reference to FIGS. 1-3, wherein like numbers are used to indicate like and corresponding parts.

Turning to the drawings, FIG. 1 illustrates a block diagram depicting selected elements of an embodiment of information handling system 100. It is noted that FIG. 1 is not drawn to scale but is a schematic illustration.

As shown in FIG. 1, components of information handling systems 100 may include, but are not limited to, a processor subsystem 10, which may comprise one or more processors, and a system bus 12 that communicatively couples various system components to processor subsystem 10 including, for example, a memory subsystem 14, an I/O subsystem 16, local storage resource 18, and network interface 20. Information handling system 100 may further comprise a complex programmable logic device 28 and basic input output system (BIOS) 26, discussed in greater detail below. Information handling system 100 may be communicatively coupled to remote access controller 30 via network 40. Remote access controller 30 may be part of a second information handling system (not shown).

Processor subsystem 10 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 10 may interpret and execute program instructions and process data stored locally (e.g., in memory subsystem 14). In the same or alternative embodiments, processor subsystem 10 may interpret and execute program instructions and process data stored remotely (e.g., in a network storage resource).

System bus 12 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Memory subsystem 14 may comprise a system, device, or apparatus operable to retain and retrieve program instructions and data for a period of time (e.g., computer-readable media). Memory subsystem 14 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Memory subsystem 14 may comprise a plurality of dual in-line memory modules (DIMMs) 22 for storing data and instructions.

In information handling system 100, I/O subsystem 16 may comprise a system, device, or apparatus generally operable to receive and transmit data to or from or within information handling system 100. I/O subsystem 18 may represent, for example, a variety of communication interfaces, graphics interfaces, video interfaces, user input interfaces, and peripheral interfaces. In various embodiments, I/O subsystem 18 may be used to support various peripheral devices, such as a touch panel, a display adapter, a keyboard, a touch pad, or a camera, among other examples. In some implementations, I/O subsystem 18 may support so-called 'plug and play' connectivity to external devices, in which the external devices may be added or removed while information handling system 100 is operating.

Local storage resource 18 may comprise computer-readable media (e.g., hard disk drive, floppy disk drive, CD-ROM, and other type of rotating storage media, flash memory, EEPROM, or another type of solid-state storage media) and may be generally operable to store instructions and data.

Network interface 20 may be a suitable system, apparatus, or device operable to serve as an interface between information handling system 100 and a network (not shown). Network interface 20 may enable information handling system 100 to communicate over a network using a suitable transmission protocol or standard. In some embodiments, network interface 20 may be communicatively coupled via a network to a network storage resource (not shown). A network coupled to network interface 20 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to network interface 20 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to network interface 20 or various components associated therewith may be implemented using hardware, software, or any combination thereof.

At times, various components in information handling system 100 may develop problems that negatively affect information handling system 100. For example, information handling systems 100 may be installed in hot or humid environments, causing a DIMM, a storage card or a network interface card (NIC) to fail. These problems may result in a hang in the Memory Reference Code (MRC) or elsewhere in the BIOS and information handling system 100 may go offline.

A common approach is to have service personnel go to the information handling system to replace the faulty component. However, information handling systems 100 may be installed in remote locations. For these information handling systems 100, service personnel may not reach the information handling system 100 for hours or days, such that information handling system 100 remains offline and unavailable for processing information. Also, sending service personnel to a remote location each time an information handling system 100 goes offline may be expensive, particularly in settings in which the location has more than one information handling system 100 and any information handling system may go down without warning.

When an information handling system 100 is located in a remote location, a common technique for trying to boot the information handling system 100 involves clearing all the BIOS settings and Non-Volatile Random Access Memory (NVRAM) variables. A NVRAM_CLR function can clear all the BIOS settings and NVRAM variables to reset the whole information handling system 100 to a default mode. However, this function may be undesirable because it sets all DIMMs 22 and PCIe slots as enabled. If the problem causing information handling system 100 to go offline is due to a faulty DIMM 22, enabling all DIMMs 22 will only result in another system hang.

Some information handling systems 100 allow a user to disable each individual DIMM slot in a BIOS setup mode. However, this option is only available once information handling system 100 boots past the memory reference code (MRC) code all the way to the BIOS setup mode.

Embodiments described herein allow a user to remotely force information handling system 100 to recover to a minimum configuration mode such that information handling system 100 is able to perform some processing. Embodiments allow a user to access information handling system 100 operating in the minimum configuration mode to diagnose the problem and possibly reconfigure information handling system 100 to a degraded configuration mode with more functionality than the minimum configuration mode.

Ideally, a user would be able to diagnose a problem with information handling system 100 and configure information handling system 100 to operate in a normal configuration mode. However, embodiments allow a user to diagnose a problem with information handling system 100 and configure information handling system 100 to operate in a degraded configuration mode with less functionality than the normal configuration mode but more functionality than the minimum configuration mode.

Figure 2:
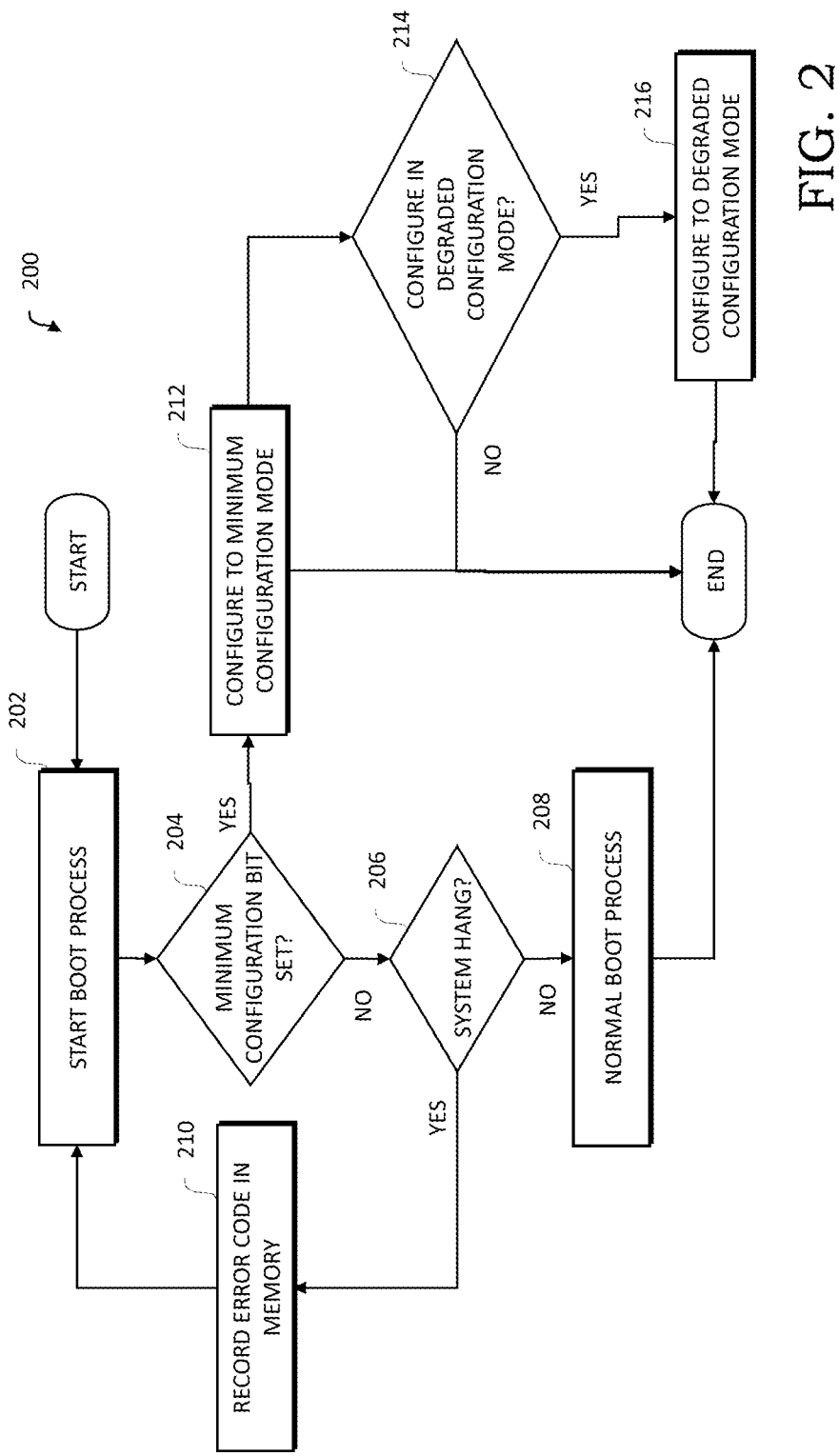
FIG. 2 is a flowgraph depicting steps in a boot process, illustrating a method for determining when to configure an information handling system in a normal configuration mode or a minimum configuration mode.

FIG. 2 depicts flow diagram 200 illustrating a method for configuring an information handling system in a minimum configuration mode.

At step 202, information handling system 100 may start a boot process. Starting the boot process may involve a power on self-test (POST) process that BIOS 26 performs to find all DIMMs 22 and other hardware and determine if all DIMMs 22 and the other hardware are functioning. In some embodiments, if information handling system 100 is hanging, a user can remotely log into a remote access controller 30 to boot information handling system 100.

At step 204, embodiments determine if a minimum configuration bit is set. In some embodiments, BIOS 26 may read a minimum configuration bit from CPLD 28. The minimum configuration bit can be set and cleared by remote access controller 30 such as Intelligent Dell Remote Access Controller (iDRAC). In some embodiments, a simple intelligent platform management interface (IPMI) command may be received from remote access controller 30. In some embodiments, BIOS 26 in early POST may query remote access controller 30 for a minimum configuration bit.

In some embodiments, a user can remotely log into remote access controller 30 and communicate with CPLD 28 to set the minimum configuration bit.

If a minimum configuration bit is not set, then at step 206, embodiments determine if information handling system 100 is processing properly or if there is a system hang that does not resolve itself.

If there is not a system hang, then at step 208, information handling system 100 continues with a normal boot process.

Steps 202, 206 and 208 form part of common boot processing of information handling systems 100.

If there is a system hang, then at step 210, an error code may be recorded in memory such as in CPLD memory. Recording an error code may further include setting the minimum configuration bit such that BIOS 26 is only able to boot information handling system 100 to a minimum configuration mode.

Referring to step 204, if a minimum configuration bit is set, then at step 212, information handling system 100 is configured to a minimum configuration mode. The minimum configuration bit may comprise flags or other notifications such that BIOS 26 boots information handling system 100 to a minimum configuration mode. In some embodiments, one or more flags may indicate which DIMM 22 of a plurality of DIMMs 22 can be accessed by BIOS 26. In some embodiments, one or more flags may indicate which PCIe boot drivers can be accessed by BIOS 26. In some embodiments, one or more flags may indicate which services of a plurality of services can be turned on by BIOS 26. In some embodiments, once information handling system 100 is booted to a minimum configuration mode, process 200 ends and information handling system 100 operates in the minimum configuration mode until service personnel replace faulty components or otherwise configure information handling system 100 to operate in a preferred configuration mode.

In some embodiments, at step 214, embodiments determine if information handling system 100 can be configured in a degraded configuration mode. In some embodiments, remote access controller 30 may communicate with CPLD 28 and determine the error code. The error code may provide some level of detail that remote access controller 30 may use to determine if information handling system 100 can be configured in a degraded configuration mode. In some embodiments, a user may use remote access controller 30 to access memory in CPLD 28 and determine if information handling system 100 can be configured in a degraded configuration mode.

If embodiments determine that information handling system 100 can be configured in a degraded configuration mode, then at step 216, embodiments may configure information handling system 100 accordingly. For example, if information handling system 100 has ten DIMMs 22 and an error code comprises information about which DIMM 22 failed, remote access controller 30 may determine other DIMMs 22 that can be initialized and configure information handling system 100 to operate in a degraded configuration with all other DIMMs 22 but without the failed DIMM 22. Operating information handling system 100 in a degraded configuration mode may include information handling system 100 operating with fewer memory devices, initializing one or more PCIe drivers and having some non-essential services turned on.

If embodiments determine that information handling system 100 cannot be configured in a degraded configuration mode (or cannot determine if information handling system can be configured in a degraded configuration mode), information handling system 100 may remain in a minimum configuration mode and process 200 ends. For example, BIOS 26 or a user at remote access controller 30 may access memory in CPLD 28 but determine the error code does not contain information about which DIMM 22 failed. To prevent further damage to information handling system 100, embodiments may not attempt to boot information handling system 100 other than in a minimum configuration mode.

Figure 3:
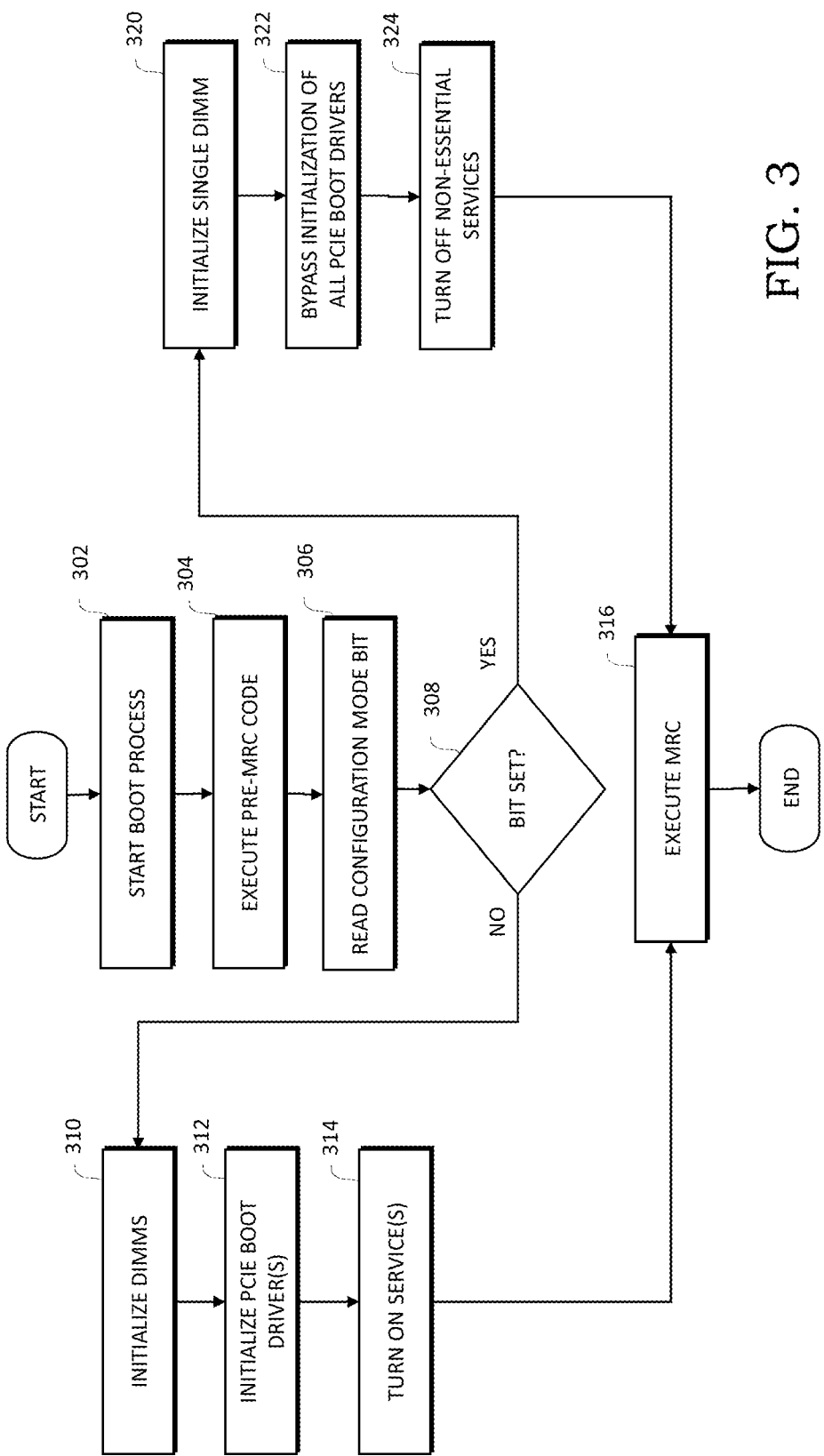
FIG. 3 is a flowgraph depicting steps in a boot process, illustrating a method for configuring an information handling system in a normal mode or a minimum configuration mode.

FIG. 3 depicts flow diagram 300 illustrating a method for booting an information handling system.

At step 302, embodiments may start a boot process. For example, when information handling system 100 starts a boot process, a power on self-test (POST) process may begin.

At step 304, information handling system 100 processes pre-memory reference code (pre-MRC) code. In some embodiments, BIOS 26 processes pre-EFI code.

At step 306, BIOS 26 reads a configuration mode bit. In some embodiments, BIOS 26 reads a configuration mode bit. The configuration mode bit may be stored in a complex programmable logic device (CPLD) 28. In some embodiments, BIOS 26 reads a configuration mode bit received from a remote access controller 30.

At step 308, BIOS 26 determines if information handling system 100 should boot into a normal configuration mode or a minimum configuration mode.

If BIOS 26 determines, based on the configuration mode bit, that information handling system 100 can boot in a normal configuration mode, then information handling system 100 starts a normal configuration boot process. In a normal configuration boot process, BIOS 26 may initialize all DIMMs 22 at step 310, initialize PCIe boot drivers at step 312 and turn on services at step 314.

If BIOS 26 determines, based on the configuration mode bit, that information handling system 100 cannot boot in a normal configuration mode, then BIOS 26 starts a minimum configuration boot process. In a minimum configuration boot process, BIOS 26 may initialize a single DIMM 22 at step 320. In some embodiments, at step 320, BIOS 26 initializes a first DIMM 22 and bypasses initialization of any other DIMMs 22. In some embodiments, at step 320, BIOS 26 determines if a DIMM 22 caused the system to hang, initializes a single DIMM 22 and bypasses all other DIMMs 22 including the faulty DIMM 22.

At step 322, BIOS 26 bypasses any steps related to initializing PCIe boot drivers and at step 324, BIOS 26 bypasses any steps related to enabling non-essential services. As an example, system management services such as inventory collection may be unnecessary because information handling system 100 is in a minimum configuration mode and attempting to communicate with a component might cause information handling system 100 to hang.

At step 316, information handling system 100 continues with other steps in a boot process. In some embodiments, BIOS 26 initializes or allows essential services. For example, embodiments may initialize or allow a BIOS setup code as an essential service.

Once the boot process has completed, information handling system 100 may operate in a minimum configuration mode. In a minimum configuration mode, a user at remote access controller 30 may access information handling system 100 over network 40 to gather more information about why information handling system 100 failed, what component failed or what subsystems or services are affected.

Some embodiments allow a user to determine a strategy for recovering the information handling system 100 to either the normal configuration mode or a degraded configuration mode having less functionality than the normal configuration mode but more functionality than the minimum configuration mode.

In some embodiments, once the information handling system boots in the minimum configuration, a user can enter BIOS setup to change configurations to re-enable DIMM slots, enable boot drivers on PCIe slots, or boot to an operating system (OS) or unified extensible firmware interface (UEFI) shell to run diagnostic tools and update FWs, etc.

In some embodiments, once the boot process has completed and information handling system 100 is operating in a minimum configuration mode, remote access controller 30 may allow a user to communicate with CPLD 28 to manually initialize or re-enable additional DIMMs 22 and enable boot drivers for PCIe slots, boot to an operating system (OS) or unified extensible firmware interface (UEFI) shell to run diagnostic tools and update firmware volumes, turn on non-essential services, etc. Embodiments may allow the user to access a log in CPLD 28 to determine what component caused the problem and initialize code associated with components and services that do not require the faulty component. For example, if information handling system 100 comprises ten DIMMs 22 and the log includes an entry identifying a DIMM 22 in slot 7 as causing a hang, embodiments may boot information handling system 100 in a minimum configuration and then automatically initialize one or more DIMMs 22 other than the DIMM 22 in slot 7.

In some embodiments, once the boot process has completed and information handling system 100 is operating in a minimum configuration mode, remote access controller 30 may communicate with CPLD 28 to automatically initialize additional DIMMs 22 and boot drivers for PCIe slots and allow non-essential services. Embodiments may access a log in CPLD 28 to determine what component caused the problem and initialize code associated with components and services that do not require the faulty component. For example, if information handling system 100 comprises ten DIMMs 22 and the log includes an entry identifying DIMM 22-2 as causing a hang, embodiments may boot information handling system 100 in a minimum configuration and then automatically initialize one or more DIMMs 22 other than DIMM 22-2. Information handling system 100 may then operate with nine of the ten DIMMs 22 such that information handling system 100 operates with less than a maximum functionality (i.e., ten DIMMs 22) but more than a minimum functionality (i.e., one DIMM 22).

In some embodiments, BIOS 26 can implement a 3-strike counter to selectively train a different DIMM 22 in case a first DIMM 22 is the one that is faulty. Thus, if BIOS 26 tries to boot information handling system 100 using DIMM 22-1 and information handling system 100 fails to boot three times, BIOS 26 may try to boot information handling system using DIMM 22-2. BIOS 26 may continue this process until information handling system 100 boots or BIOS 26 has tried all DIMMs 22.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method for configuring an information handling system in a minimum configuration mode, the method comprising:

at a remote access controller communicatively coupled to an information handling system:
    determining a system hang;
    identifying a first memory module from a plurality of memory modules in the information handling system, wherein the first memory module is associated with the system hang;
    setting a flag corresponding to the first memory module;
    identifying a second memory module from the plurality of memory modules in the information handling system, wherein the second memory module is not associated with the system hang;
    communicating a configuration mode bit and the flag to the information handling system, wherein the configuration mode bit and the flag are set to cause the information handling system to boot in a minimum configuration mode using the second memory module; and
storing, in a memory device in the information handling system, the configuration mode bit and the flag;
starting, by a Basic Input Output system (BIOS), a power on self-test;
reading, by the BIOS, the configuration mode bit and the flag from the memory device;
determining based on the configuration mode bit, the information handling system should boot in the minimum configuration mode; and
booting the information handling system in the minimum configuration mode, wherein the second memory module is initialized and the BIOS bypasses all peripheral component interconnect express (PCIe) slot driver initializations and any non-essential services.

2. The method of claim 1, wherein the memory device comprises a Complex Programmable Logic Device (CPLD).

3. The method of claim 1, wherein booting the information handling system in the minimum configuration mode comprises:
    determining the first memory module is a dual in-line memory module (DIMM);
    determining one or more DIMMs of the plurality of memory modules that are not associated with the flag; and
    initializing one DIMM of the one or more DIMMs that are not associated with the flag as the second memory module.

4. The method of claim 1, wherein booting the information handling system in the minimum configuration mode comprises booting to a BIOS setup code.

5. The method of claim 1, wherein booting the information handling system in the minimum configuration mode comprises booting to a unified extensible firmware interface (UEFI) code.

6. The method of claim 1, wherein reading the configuration mode bit and the flag comprises a Complex Programmable Logic Device (CPLD) reading from the memory device in the information handling system.

7. The method of claim 1, wherein reading the configuration mode bit and the flag comprises receiving the configuration mode bit and the flag from the remote access controller communicatively coupled to the information handling system over a network.

8. A system for configuring an information handling system in a minimum configuration mode, the system comprising:

a remote access controller communicatively coupled to the information handling system, the remote access controller configured to:
    determine a system hang associated with the information handling system;
    identify a first memory module from a plurality of memory modules in the information handling system, wherein the first memory module is associated with the system hang;
    set a flag corresponding to the first memory module;
    identify a second memory module from the plurality of memory modules in the information handling system, wherein the second memory module is not associated with the system hang; and
    communicate a configuration mode bit and the flag to the information handling system, wherein the configuration mode bit and the flag are set to cause the information handling system to boot in a minimum configuration mode using the second memory module; and
a memory device in the information handling system storing the configuration mode bit and the flag;
a basic input output system (BIOS) configured to:
    start a power on self-test;
    read the configuration mode bit and the flag from the memory device;
    determine, based on the configuration mode bit, the information handling system should boot in the minimum configuration mode; and
    boot the information handling system in the minimum configuration mode, wherein the second memory module is initialized and the BIOS bypasses all peripheral component interconnect express (PCIe) slot driver initializations and any non-essential services.

9. The system of claim 8, wherein
the memory device comprises a Complex Programmable Logic Device (CPLD).

10. The system of claim 8, wherein the BIOS is configured to:
    determine the first memory module is a dual in-line memory module (DIMM);
    determine one or more DIMMs of the plurality of memory modules that are not associated with the flag; and
    initialize one DIMM of the one or more DIMMs that are not associated with the flag as the second memory module.

11. The system of claim 8, wherein the BIOS is configured to boot the information handling system to a BIOS setup code.

12. The system of claim 8, wherein the information handling system is configured to boot to a unified extensible firmware interface (UEFI) code.

13. The system of claim 8, wherein a Complex Programmable Logic Device (CPLD) in the information handling system is configured to read the configuration mode bit and the flag from the memory device.

14. The system of claim 8, wherein the configuration mode bit and the flag received from the remote access controller communicatively coupled to the information handling system over a network.

15. An information handling system, comprising:
a processor subsystem;
a memory subsystem comprising an array of memory modules, wherein the information handling system is communicatively coupled to a remote access controller over a network, wherein the remote access controller is configured to;
determine a system hang associated with the information handling system;
identify a first memory module of the plurality of memory modules, wherein the first memory module is associated with the system hang;
set a flag corresponding to the first memory module;
identify a second memory module of the plurality of memory modules, wherein the second memory module is not associated with the system hang; and
communicate a configuration mode bit and the flag to the information handling system, wherein the configuration mode bit and the flag are set to cause the information handling system to boot in a minimum configuration mode using the second memory module; and the information handling system further comprises:
a memory device in the information handling system configured to store the configuration mode bit and the flag received from the remote access controller, wherein the configuration mode bit and the flag are set to cause the information handling system to boot in a minimum configuration mode using the second memory module;
a basic input output system (BIOS) configured to:
start a power on self-test;
read the configuration mode bit and the flag from the memory device;
determine, based on the configuration mode bit, the information handling system should boot in the minimum configuration mode; and
boot the information handling system in the minimum configuration mode, wherein the second memory module is initialized and the BIOS bypasses all peripheral component interconnect express (PCIe) slot driver initializations and any non-essential services.

16. The information handling system of claim 15, wherein:
the memory device comprises a Complex Programmable Logic Device (CPLD).

17. The information handling system of claim 15, wherein the BIOS is configured to:
determine the first memory module comprises a dual in-line memory module (DIMM);
determine one or more DIMMs of the plurality of memory modules that are not associated with the flag; and
initialize one DIMM of the one or more DIMMs that are not associated with the flag as the second memory module.

18. The information handling system of claim 15, wherein the BIOS is configured to boot the information handling system to a BIOS setup code or a unified extensible firmware interface (UEFI) code.

19. The information handling system of claim 15, wherein a Complex Programmable Logic Device (CPLD) in the information handling system is configured to read the configuration mode bit and the flag.

20. The information handling system of claim 12, wherein the CPLD comprises the memory device for storing the configuration mode bit and the flag received from the remote access controller communicatively coupled to the information handling system over the network.

* * * * *